United States Patent
Ewing et al.

(10) Patent No.: US 9,219,353 B2
(45) Date of Patent: Dec. 22, 2015

(54) EQUIPMENT-RACK POWER DISTRIBUTION SYSTEM WITH COOLING

(75) Inventors: Carrel W. Ewing, Reno, NV (US); Brandon Ewing, Reno, NV (US); Edi Murway, Washoe Valley, NV (US)

(73) Assignee: Server Technology, Inc., Reno, NV (US)

( * ) Notice: Subject to any disclaimer, the term of this patent is extended or adjusted under 35 U.S.C. 154(b) by 244 days.

(21) Appl. No.: 13/293,078

(22) Filed: Nov. 9, 2011

(65) Prior Publication Data

US 2012/0120559 A1     May 17, 2012

Related U.S. Application Data

(60) Provisional application No. 61/411,831, filed on Nov. 9, 2010.

(51) Int. Cl.
   *H05K 7/20* (2006.01)
   *H02B 1/56* (2006.01)

(52) U.S. Cl.
   CPC ..................................... *H02B 1/565* (2013.01)

(58) Field of Classification Search
   USPC ......................... 361/676–678, 679.46–679.54,
                      361/688–722, 752, 756, 796, 891
   See application file for complete search history.

(56) References Cited

U.S. PATENT DOCUMENTS

| | | | |
|---|---|---|---|
| 5,216,579 A * | 6/1993 | Basara et al. | 361/679.46 |
| 5,297,005 A | 3/1994 | Gourdine | |
| 6,148,907 A | 11/2000 | Cheng | |
| 6,188,567 B1 | 2/2001 | Borke | |
| 6,822,861 B2 * | 11/2004 | Meir | 361/695 |
| 7,255,640 B2 | 8/2007 | Aldag et al. | |
| 7,268,998 B2 | 9/2007 | Ewing et al. | |
| 7,542,268 B2 * | 6/2009 | Johnson, Jr. | 361/622 |
| 7,573,713 B2 * | 8/2009 | Hoffman et al. | 361/697 |
| 7,646,590 B1 * | 1/2010 | Corhodzic et al. | 361/641 |
| 8,212,427 B2 * | 7/2012 | Spitaels et al. | 307/147 |
| 2002/0063476 A1 | 5/2002 | Rolls et al. | |
| 2003/0117760 A1 * | 6/2003 | Meir | 361/103 |
| 2005/0024825 A1 * | 2/2005 | Smith et al. | 361/687 |
| 2005/0094357 A1 * | 5/2005 | Ewing et al. | 361/626 |

(Continued)

FOREIGN PATENT DOCUMENTS

| | | |
|---|---|---|
| JP | 2000166030 A | 6/2000 |
| KR | 20050022432 A | 3/2005 |
| KR | 20110087006 A | 8/2011 |

OTHER PUBLICATIONS

International Search Report; PCT/US2011/060060, filed Nov. 9, 2011; Applicant Server Technology, Inc. et al.

(Continued)

*Primary Examiner* — Courtney Smith
(74) *Attorney, Agent, or Firm* — Perkins Coie LLP

(57) ABSTRACT

An equipment-rack power distribution system is described which includes a PDU housing, a power input penetrating the housing, a plurality of power outlets disposed on a surface of the housing, circuitry enclosed in the housing interconnecting the power input and the power outlets, one or more air inlets associated with the housing, one or more air outlets associated with the housing, and an air flow device in fluid communication with one or more of the air inlets and the air outlets. An environmental sensor may activate the air flow device upon detection of predetermined environmental conditions, such as a temperature that is above a defined limit.

29 Claims, 8 Drawing Sheets

(56) References Cited

U.S. PATENT DOCUMENTS

| | | | |
|---|---|---|---|
| 2005/0101193 A1* | 5/2005 | Godard | 439/652 |
| 2007/0159775 A1* | 7/2007 | Ewing et al. | 361/642 |
| 2012/0069514 A1* | 3/2012 | Ross | 361/679.33 |

OTHER PUBLICATIONS

Extended European Search Report for European Patent Application No. 11839994.8; dated Mar. 19, 2014; 7 pages.

* cited by examiner

EQUIPMENT-RACK POWER DISTRIBUTION SYSTEM WITH COOLING

CROSS-REFERENCE TO RELATED APPLICATIONS

The present Application for Patent claims priority to U.S. Provisional Patent Application No. 61/411,831 entitled "EQUIPMENT-RACK POWER DISTRIBUTION SYSTEM WITH COOLING" filed Nov. 9, 2010, and assigned to the assignee hereof and hereby expressly incorporated by reference herein.

BACKGROUND

Power distribution units (PDUs) for electrical equipment racks such as RETMA racks are becoming highly sophisticated. Once little more than a simple plug-strip, today a PDU may include complex circuitry that can perform such functions as switching any of numerous outlets off and on, receiving commands from and transmitting data to remote power managers, and controlling power sources such as uninterruptible power supplies (UPSs). Such a PDU may include a microprocessor and embedded software and may be accessed through a web browser under control of a remotely-located user. Examples of such PDUs may be found in U.S. Pat. Nos. 7,116,550, 7,137,850, 7,171,461, and 7,196,900, all of which are incorporated herein by this reference.

Physical space that can accommodate a PDU in an equipment rack is at a premium because most of the space in such a rack is occupied by computers and other electronic appliances. Most or all of these appliances draw power from the PDU. Accordingly, PDUs typically are built in long, narrow, tight enclosures that have barely enough room to accommodate one or more power inlets and up to 24 or more power outlets. Such PDUs are often designed with a vertical form factor to facilitate mounting vertically in a back corner area of an equipment rack, out of the way of the appliances in the rack but accessible from the rear of the rack so that the appliances can readily be plugged into and unplugged from the outlets.

In general, PDU housings have not expanded despite the addition of more complex circuitry that gives the PDUs more capabilities. However, this circuitry generates heat, and as more such circuitry is added into the confined space of a PDU housing, dissipating this heat has become a significant problem.

Adding to the heat dissipation problem has been the trend to install increasingly-complex computers and other appliances, and more of them, in electrical equipment racks. This has had the effect of generating more heat within the rack, making more demands on the PDU and thereby increasing the amount of heat generated by circuitry within the PDU, and reducing the volume of air in the rack that can dissipate that heat. The combination of more heat generated in a confined space within the PDU, more heat generated by the appliances in the rack, and less air space in the rack, has led to great difficulty in keeping the internal temperatures within PDUs within safe limits.

The general problem of thermal management in equipment racks has been recognized, and various methods and devices have been proposed for cooling computers, computer power supplies, and other appliances in an equipment rack. By way of example, in U.S. Pat. No. 7,173,821 issued to Coglitore, it is proposed to install various appliances back-to-back in a rack with an overhead power supply, with cooling air to flow between the appliances, and to locate a central power supply in a rack by itself with a dedicated cooling system.

SUMMARY

Briefly and in general terms, the problem of heat dissipation in an equipment-rack PDU is solved by circulating cooling air through the PDU. An equipment-rack power distribution system according to an embodiment includes a PDU housing, a power input penetrating the housing, a plurality of power outlets disposed on a surface of the housing, circuitry enclosed in the housing interconnecting the power input and the power outlets, one or more air inlets associated with the housing, one or more air outlets associated with the housing, and an air flow device coupled to at least one of the air inlets and the air outlets.

Spaces between the outlets and the housing may be closed with gaskets. The air flow device may include a fan and a conduit defining an air passage between the fan and the housing. In an embodiment having two fans, a baffle may be pivotingly disposed between the fans so that when both fans are activated the flow of air from the fans urges the baffle into a neutral position and when one fan is activated the flow of air urges the baffle against the other fan. An environmental sensor, such as a thermostat, may be used to activate the fan depending on temperature inside the PDU housing.

DETAILED DESCRIPTION

Figure 1:
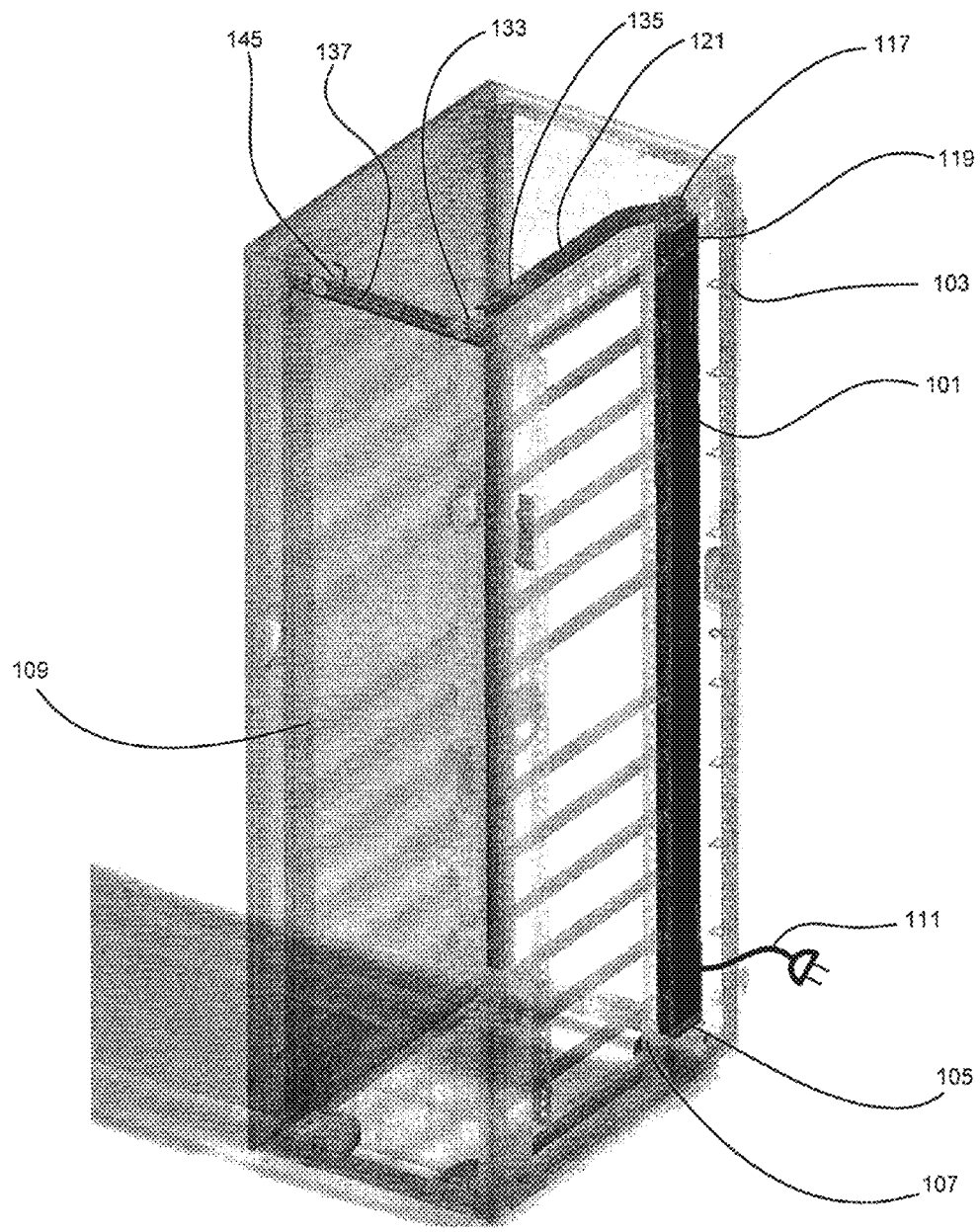
FIG. 1 is a perspective view of an equipment rack with an installed PDU according to an embodiment, taken from the front of the rack.
Figure 2:
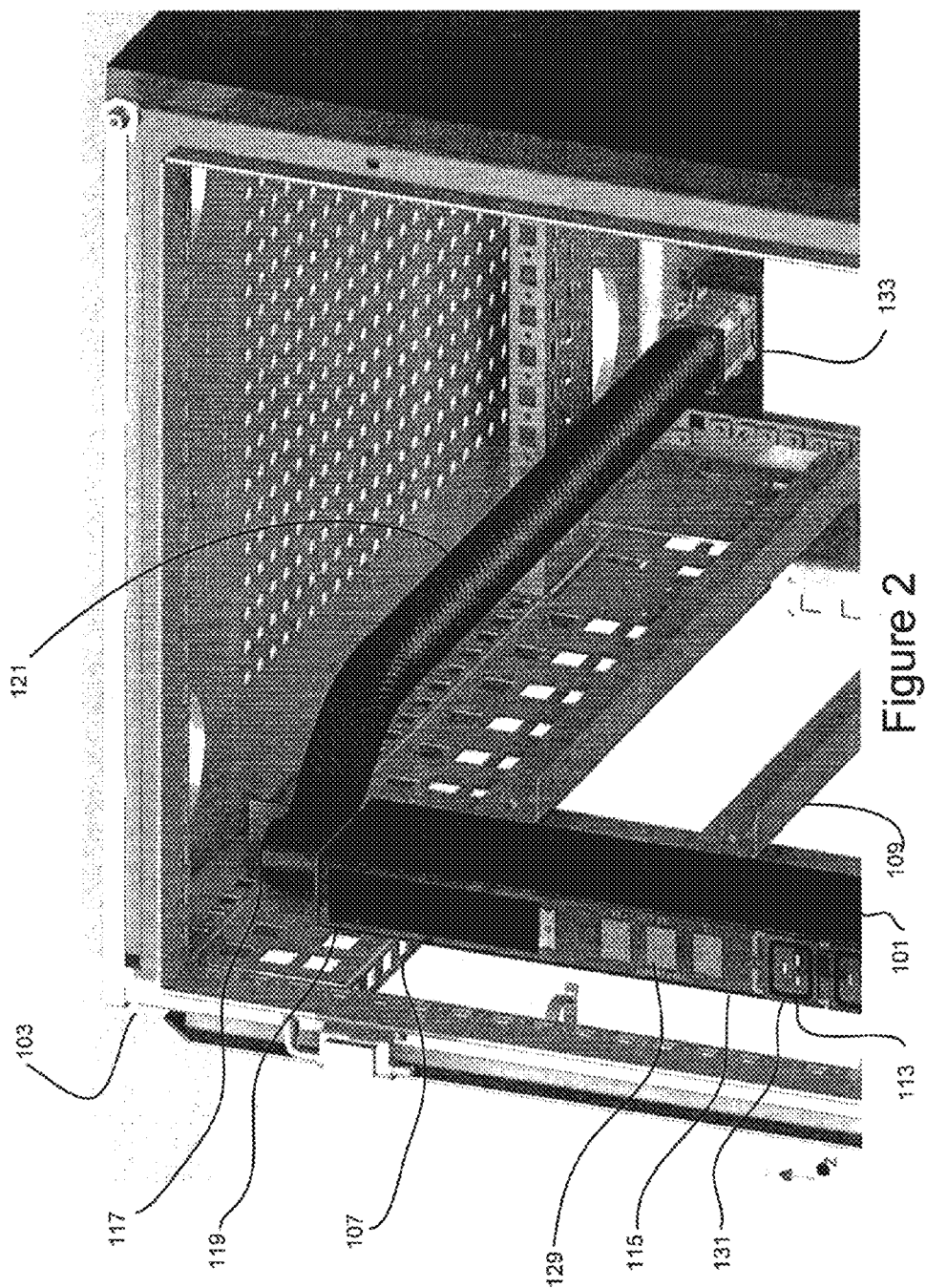
FIG. 2 is a perspective view of an upper portion of an equipment rack with an installed PDU according to an embodiment, taken from the rear of the rack.
Figure 3:
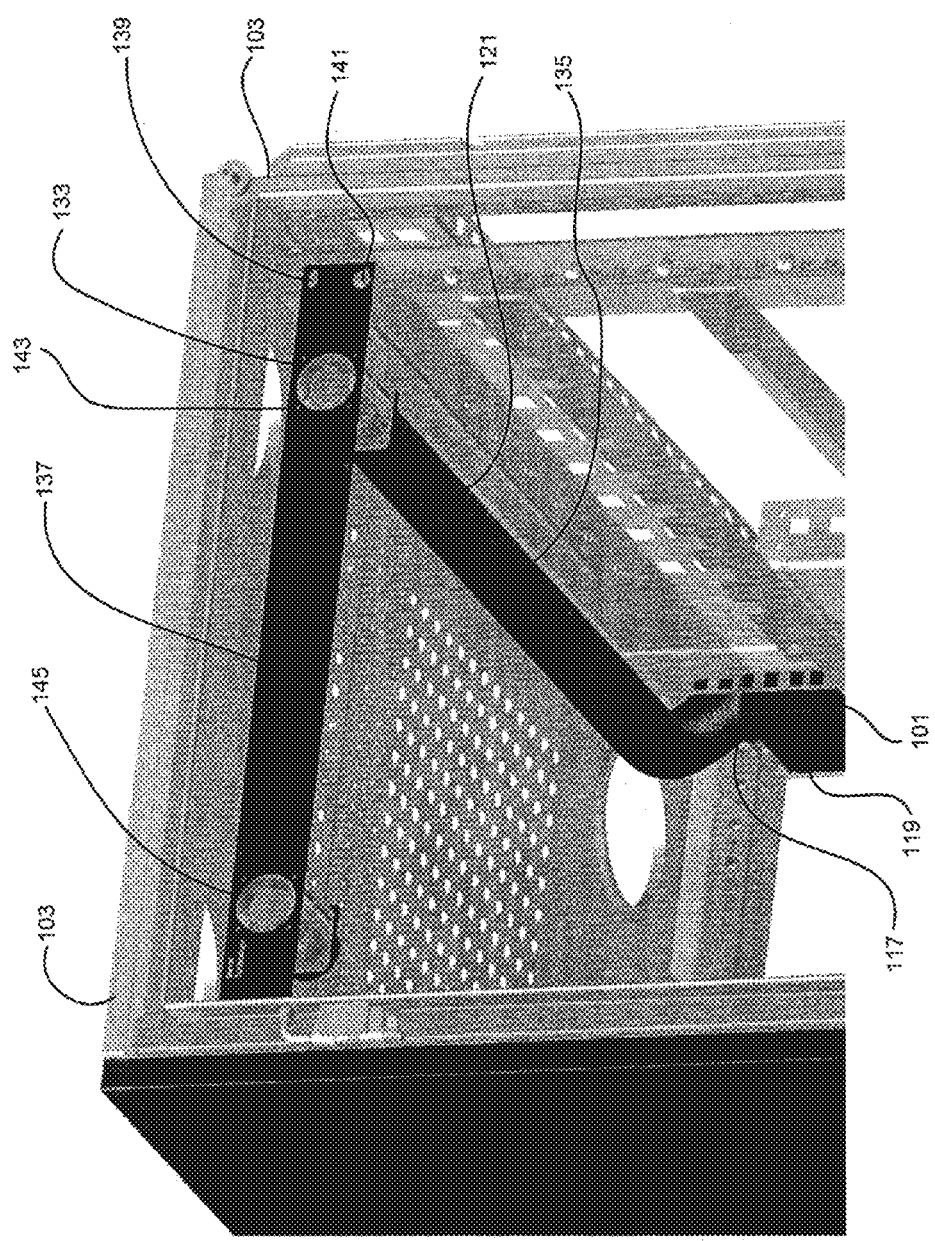
FIG. 3 is a perspective view of an upper portion of an equipment rack with an installed PDU according to an embodiment, taken from the front of the rack.

As shown in FIGS. 1 through 3, an equipment-rack power distribution system according to an embodiment includes an elongated power distribution unit (PDU) housing 101. The housing is shown installed in a rack such as a RETMA equipment rack 103. The PDU housing may be secured to the rack by any convenient mounting fixture. For example, the PDU housing may be supported by a bracket 105, by fasteners (not shown) extending through holes in the housing and through a bracket 107 that is part of the rack, or some other mounting arrangement as desired. A plurality of supports such as shelf brackets 109 are included in the rack and are used for supporting computers and other appliances that are installed in the rack. While several of the illustrated embodiments provide PDU housings that are vertically mountable in equipment racks, it will be readily understood that the concepts described herein also apply to PDUs having other form factors, such as horizontally mountable units.

A power input 111 penetrates the housing 101 and provides power to the PDU. The power input may be in the form of a single-phase power cord and plug as shown, it may be a 3-phase power cord and plug, or it may be a permanently-wired electrical supply such as Romex cable or the like. The power input may, in some embodiments, include dual or redundant power inputs. Power outlets 113 are disposed in a surface 115 of the housing. Circuitry (not shown) enclosed in the PDU housing interconnects the power input and the power outlets and may perform other functions such as sensing parameters of electrical power flow through the outlets, controlling the outlets, and communicating with an external power manager application (not shown).

Figure 4:
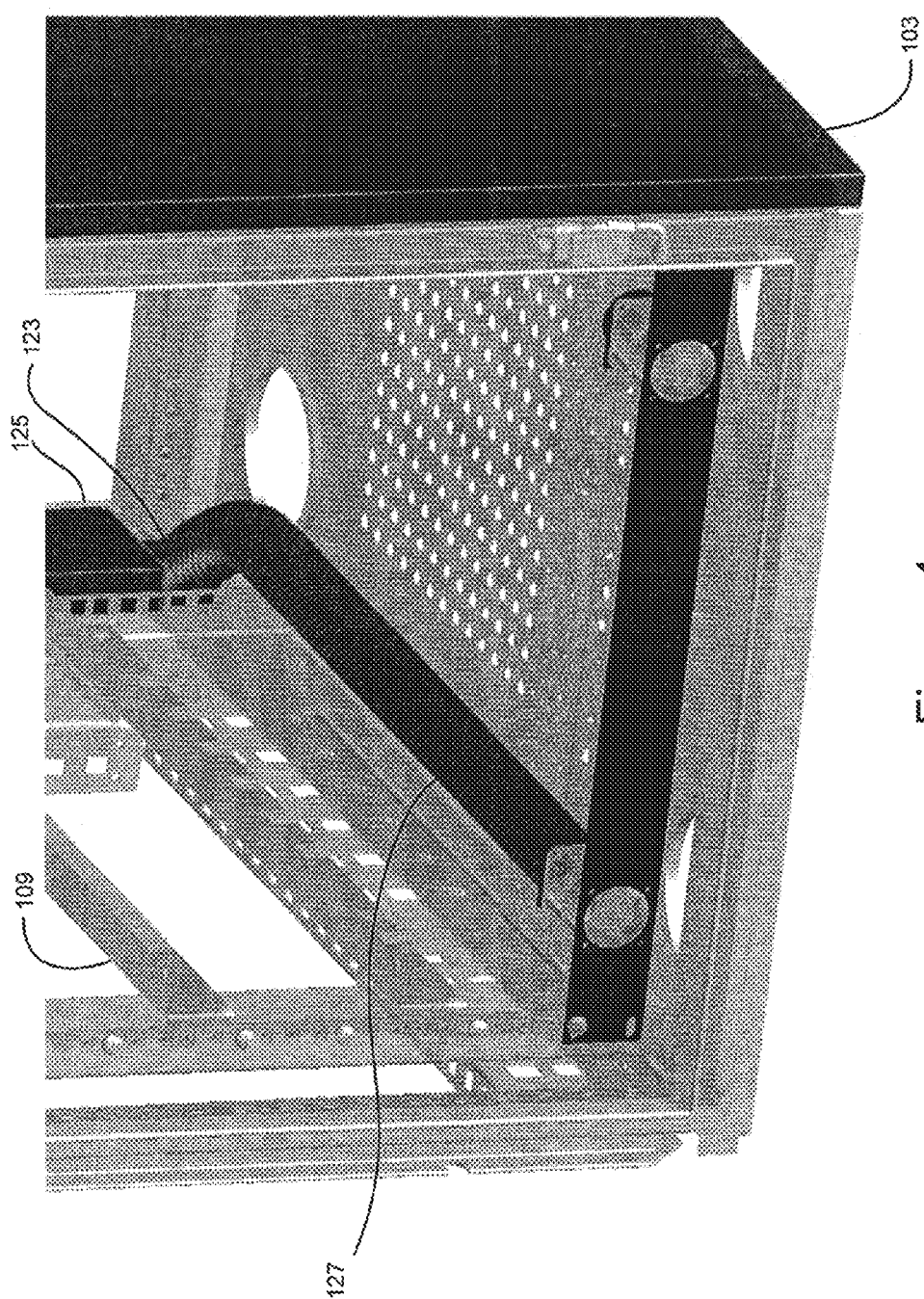
FIG. 4 is a perspective view of a lower portion of an equipment rack with an installed PDU according to an embodiment, taken from the front of the rack.

An air inlet 117 is disposed in a first end 119 of the housing. In the illustrated embodiment, an air flow device 121 is coupled to the air inlet. In another embodiment as shown in FIG. 4, an air outlet 123 is disposed in a second end 125 of the housing and an air flow device 127 is coupled to the air outlet. Some embodiments may use air circulation devices for both air inlet and air outlet, other embodiments use an air circulation device only at one of the inlet and the outlet.

Returning to FIG. 2, in some embodiments a digital readout 129 disposed in the housing, or another indicator in communication with the circuitry, gives a visual display of information such as current flow to one or all of the outlets, voltage, temperature, or other parameter respecting the PDU.

A plurality of gaskets such as the gasket 131 may be used to minimize air leakage around the power outlets. Each such gasket forms a seal between one of the outlets and the housing. The gaskets may be rubber, synthetic rubber, or some other substance that conforms to the edges of the outlet and the surface 115 of the housing.

The air flow device 121 may include at least one fan 133 and a conduit 135 defining an air passage between the fan and the housing. It will be readily understood that an air flow device may, in other embodiments, may include more or fewer components, such as simply a fan located within, or immediately adjacent to, the PDU housing. With continuing reference to the air flow device 121 of the embodiment of FIG. 3, a bracket 137 includes an equipment-rack mounting fixture such as openings 139 that receive a fastener 141 to attach the bracket to the rack. A fan mounting fixture such as a plurality of openings 143 can receive a fastener (not shown) to attach the fan 133 to the bracket 137. Some embodiments use more than one fan, for example a second fan 145 shown as carried by the bracket 137.

Some embodiments may omit the fan. Air within the housing is warmed by wiring and circuitry in the housing and rises, exiting the housing at the top. This results in fresh, relatively cool air being drawn into the housing at the bottom, setting up a flow pattern of air flowing into the housing at the bottom, drawing heat from the circuitry and wiring in the housing, rising as it draws the heat, and exiting the housing at the top. Conduits may be used to provide air flow paths from the exterior of the rack to the bottom of the housing or from the top of the housing to the exterior of the rack or both. In the illustrated embodiments, an air flow device may be coupled to the air inlet, which may be located at or near either the top or bottom of the housing, so that the device urges cool air through the conduit into the housing. Warmed air is thereupon expelled through the air outlet at or near the opposite end of the housing. An air flow device, in other embodiments, may be coupled to the air outlet to draw warm air out of the housing. In some embodiments air flow devices are used at both the air inlet and the air outlet. The air outlet may, in some embodiments, include a plurality of openings in the PDU housing that allow air that is urged into the housing through the air inlet(s) to exit the PDU housing and draw heat away from components within the housing. The air outlets may be located uniformly along one or more surfaces of the housing, or may be located to provide enhanced air flow around certain components within the housing.

In embodiments having a fan, the fan draws cool air, for example, from outside the equipment rack as in the embodiments shown in FIGS. 1 through 4, and urges this cool air into the housing. This action of the fan causes air to flow through the housing, drawing away heat, and then out of the housing through the air outlet. In some embodiments a duct may conduct the warmed air away from the air outlet, for example to the exterior of the equipment rack.

Figure 5:
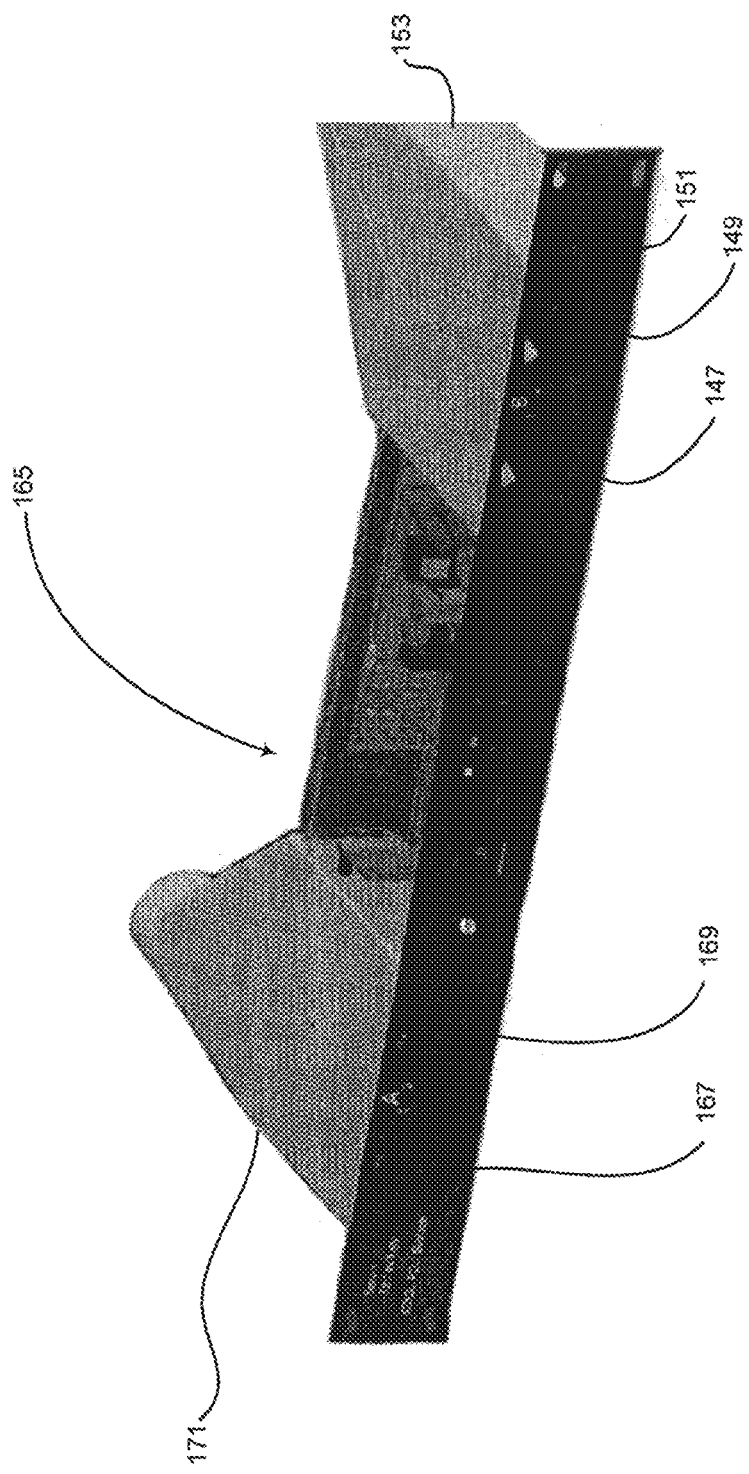
FIG. 5 is a perspective view of a bracket-and-fan assembly taken from the front.
Figure 6:
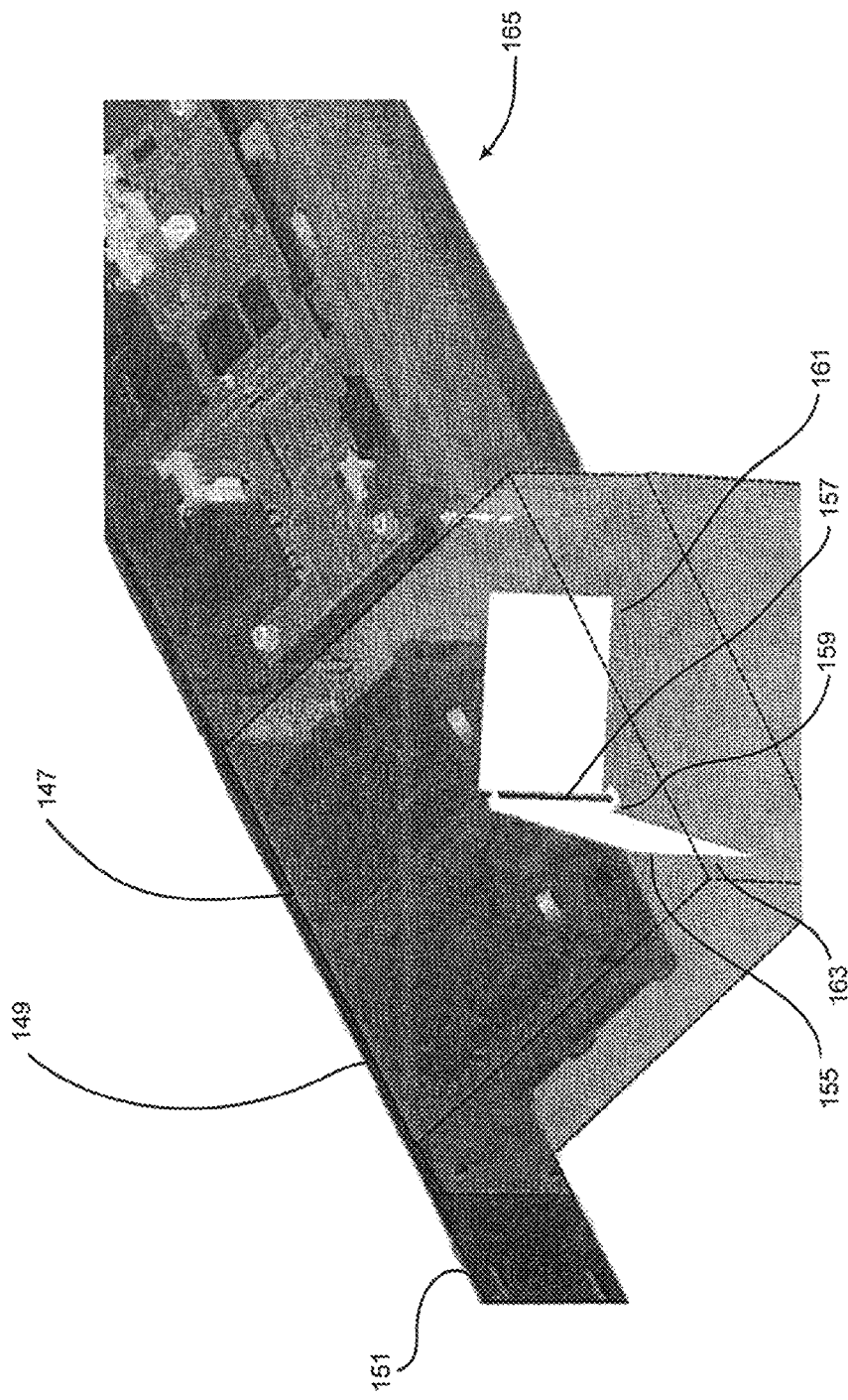
FIG. 6 is a perspective view of a bracket-and-fan assembly taken from the rear and with the conduit removed to show the baffle with both fans operating.
Figure 7:
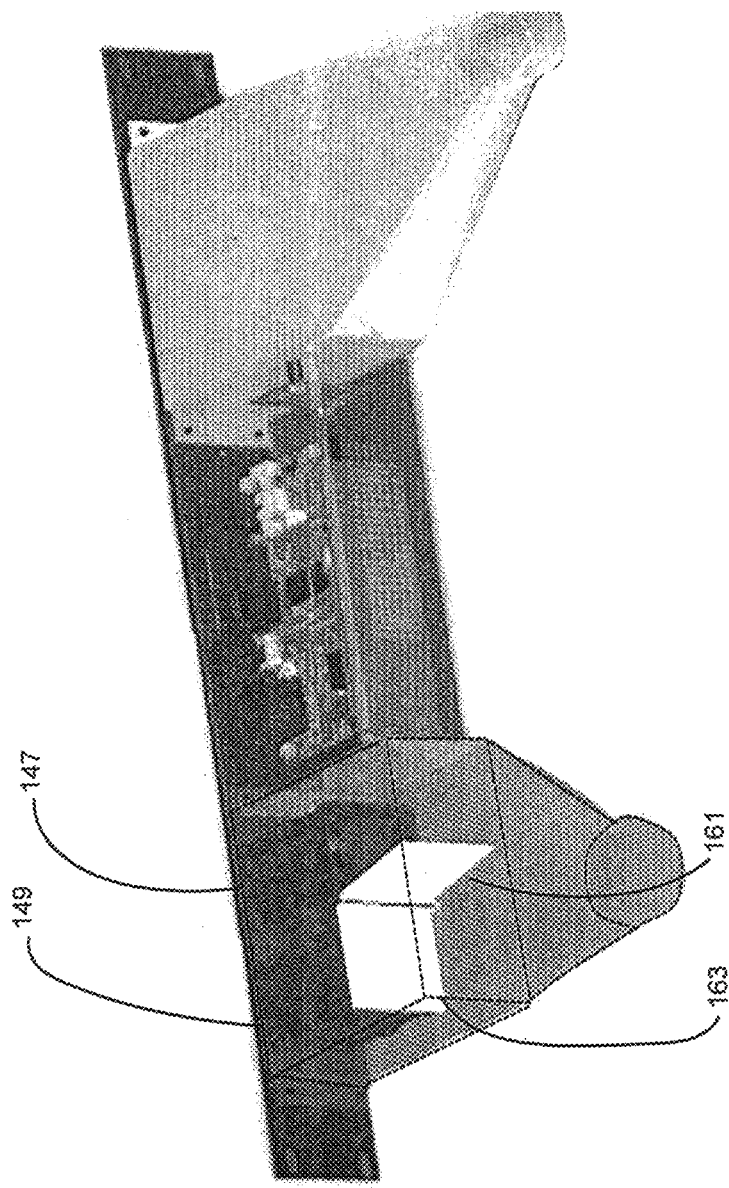
FIG. 7 is a perspective view of a bracket-and-fan assembly taken from the rear and with the conduit removed to show the baffle with one fan operating.

Two fans may be installed adjacent each other as shown in FIGS. 5 through 7. A first fan 147 and a second fan 149 are carried by a bracket 151 and enclosed by a single conduit 153. A baffle 155 is pivotally disposed between the two fans, according to this embodiment. For example, the baffle may be supported by a pivot shaft 157 on pivot points 159. The baffle may have first and second air plates 161 and 163, respectively, the first air plate 161 disposed to receive air flowing from one of the fans 147 and the second air plate 163 disposed to receive air flowing from the other of the fans 149. When both fans are activated the flow of air from the fans urges the baffle into a neutral position as shown in FIG. 6, and when one fan is activated the flow of air urges the baffle against the other fan. For example, as shown in FIG. 7, when the first fan 147 is activated and the second fan 149 is not activated, air flow from the fan 147 pushes against the first air plate 161, urging the baffle to pivot about the pivot shaft 157 and press the second air plate 163 against the second fan 149, preventing air from escaping through the second fan 149 back out of the rack.

An environmental sensor, such as a thermostat, shown generally as 165, may be used is some embodiments to provide enhanced cooling. The environmental sensor 165 is in electrical communication with the fans and is responsive to temperature in the housing to activate, none, one, or more fans as needed to keep the temperature inside the housing within desired limits. The thermostat may include a temperature sensor (not shown) inside the housing, for example.

More than two fans may be provided according to some embodiments. A third fan 167 and a fourth fan 169, for example, may be installed in the panel 151 and enclosed in a conduit 171. The conduit 153 may extend to the air inlet 117 of the housing and the conduit 171 may extend to the air outlet 123. The fans 149 and 147 would draw cool air from outside the rack and urge it into the housing, and the fans 167 and 169 would draw warm air from the housing and urge it out of the rack. Or the conduit 171 may join the conduit 153 to provide a higher rate of air flow or to provide more precise control over the volume of cooling air flow by allowing for selective activation of various ones of the fans.

Figure 8:
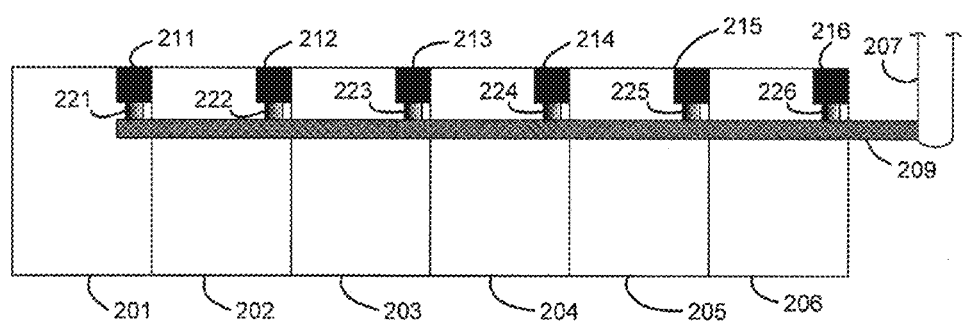
FIG. 8 is a top view of a plurality of equipment racks with a cooling duct connected to PDUs in the racks.

FIG. 8 illustrates a configuration in which a plurality of equipment racks 201, 202, 203, 204, 205 and 206 are furnished with cooling air from an external source (not shown). The external source may be a central air conditioner or other device from which a flow of cooling air may be obtained. This cooling air flows from the source through a conduit 207 into a duct 209. The duct 209 is connected to a PDU housing 211 through a connecting duct 221 in the equipment rack 201, to a PDU housing 212 through a connecting duct 222 in the equipment rack 202, to a PDU housing 213 through a connecting duct 223 in the equipment rack 203, to a PDU housing 214 through a connecting duct 224 in the equipment rack 204, to a PDU housing 215 through a connecting duct 225 in the equipment rack 205, and to a PDU housing 216 through a connecting duct 226 in the equipment rack 206. Or the duct 209 may be configured to connect directly to the various PDU housings, in which case the connecting ducts may be omitted. Other ducting configurations may be used if desired. As with the embodiments already described, the air may flow either up or down through the PDUs. For example, the duct 209 may be located on top of the equipment racks and air may be urged through it, for example by fans (not shown) into the upper extremities of the PDU housings and down through the housings. Or the duct 209 may be located beneath the equipment racks and air urged through it into the lower extremities of the PDU housings.

A cooling system constructed according to an embodiment was tested. Sensors were used to detect the actual temperatures of various components within the PDU. First the system was tested with no cooling and with a nominal ambient temperature of 50° C. in the interior of the rack. Next the system was tested with cooling in operation and the same ambient temperature. Finally the system was tested with cooling in operation and a nominal ambient temperature of 70° C. in the interior of the rack.

TABLE I

First Test Sequence

| TC-08-A channel# | Thermocouple Location | Recorded Temp. Non-Cool PDU @50 C. (deg. C.) | Recorded Temp. Cool PDU @50 C. (deg. C.) | Recorded Temp. Cool PDU @70 C. (deg. C.) |
|---|---|---|---|---|
| 1 | Surface of PCB-0275 (Input Distribution Board) Between P1 and P9 tabs. | 77.2 | 55.7 | 66.1 |
| 2 | Surface of U1 on PCA-0296 (TRMS Board) | 58.9 | 47.2 | 58.2 |
| 3 | Surface of U1 on PCA-0325 (BCS Board) | 65.2 | 41.8 | 49.2 |
| 4 | Surface of PCB-0349 (CDU_IPM_C1913) on Upper branch (L1.) | 81.6 | 39.7 | 45.2 |
| 5 | Surface of Filtering Capacitor of PS Board. C2 of Kaga. | 66.1 | 31.8 | 35.7 |
| 6 | Surface of Transformer Coil of PS Board. T1 of Kaga. | 74.6 | 34.9 | 38.8 |
| 7 | Outside Enclosure at pre-determined product hot spot. | 53.9 | 46.1 | 59.8 |
| 8 | Chamber Ambient Temperature. | 52.0 | 52.3 | 72.5 |

In the first test sequence, the actual ambient temperatures (line 8) exceeded the nominal ambient temperatures. With no cooling, the temperatures of the various components (lines 1-6) all significantly exceeded the ambient. With cooling, the temperatures of all components were substantially lowered, all but one component being well below the 50° ambient and all of them being substantially below the 70° ambient.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. An equipment-rack power distribution system comprising:
   a power distribution unit housing;
   a power input penetrating the housing;
   a plurality of power outlets disposed on a surface of the housing;
   circuitry enclosed in the housing interconnecting the power input and the power outlets;
   at least one air inlet associated with the housing;
   at least one air outlet associated with the housing; and
   an air flow device coupled in fluid communication with one or more of the at least one air inlet and the at least one air outlet,
   wherein the air flow device comprises:
      at least one fan and a conduit defining an air passage between the at least one fan and the housing; and
      an equipment rack mounting bracket and a fan mounting fixture coupled with the equipment rack mounting bracket.

2. The system of claim 1 and further comprising a plurality of gaskets, the plurality of gaskets forming seals between the plurality of power outlets and the housing.

3. The system of claim 1 wherein the housing is configured for vertical mounting in the equipment rack.

4. The system of claim 1 wherein the air flow device is coupled to one or more of the at least one air inlet.

5. The system of claim 4 wherein the at least one fan draws air from outside the equipment rack and urges the air into the housing.

6. The system of claim 1 wherein the at least one fan urges air into the housing.

7. The system of claim 6 wherein the at least one fan draws air from outside the housing and urges the air through the housing to one or more of the at least one air outlet.

8. The system of claim 1 wherein the air circulation flow device comprises a plurality of fans.

9. The system of claim 8 and further comprising a baffle pivotally disposed between one or more of the plurality of fans.

10. An equipment-rack power distribution system comprising:
    a power distribution unit housing;
    a power input penetrating the housing;
    a plurality of power outlets disposed on a surface of the housing;
    circuitry enclosed in the housing interconnecting the power input and the power outlets;
    at least one air inlet associated with the housing;
    at least one air outlet associated with the housing; and
    an air flow device coupled in fluid communication with one or more of the at least one air inlet and the at least one air outlet, wherein the air flow device comprises:
       a plurality of fans and a conduit defining an air passage between at least one of the plurality of fans and the housing; and a baffle pivotally disposed between two or more of the plurality of fans, the baffle comprising first and second air plates, the first air plate disposed to receive air flowing from one of the plurality of fans and the second air plate disposed to receive air flowing from another one of the plurality of fans.

11. The system of claim 10 wherein, when the plurality of fans are activated, the flow of air from the plurality of fans urges the baffle into a predetermined position.

12. The system of claim 10 and further comprising a temperature sensor in electrical communication with the plurality of fans, the temperature sensor responsive to temperature in the power distribution unit housing to activate one or more of the plurality of fans.

13. The system of claim 12 wherein the temperature sensor comprises one or more of a thermocouple and a thermostat.

14. The system of claim 10 and further comprising a plurality of gaskets, the plurality of gaskets forming seals between the power outlets and the housing.

15. The system of claim 10 wherein the housing is configured for vertical mounting in the equipment rack.

16. The system of claim 10 wherein the air flow device is coupled to one or more of the at least one air inlet.

17. The system of claim 10 wherein at least one of the plurality of fans draws air from outside the equipment rack and urges the air into the housing.

18. The system of claim 10 wherein at least one of the plurality of fans urges air into the housing.

19. The system of claim 18 wherein at least one of the plurality of fans draws air from outside the housing and urges the air through the housing to one or more of the at least one air outlet.

20. An equipment-rack power distribution system comprising:
   a power distribution unit housing;
   a power input penetrating the housing;
   a plurality of power outlets disposed on a surface of the housing;
   circuitry enclosed in the housing interconnecting the power input and the power outlets;
   at least one air inlet associated with the housing;
   at least one air outlet associated with the housing;
   an air flow device coupled in fluid communication with one or more of the at least one air inlet and the at least one air outlet, wherein the air flow device comprises at least one fan and a conduit defining an air passage between the at least one fan and the housing; and
   an environmental sensor coupled with the air flow device to activate the air flow device when a predetermined condition is sensed.

21. The system of claim 20, wherein the environmental sensor comprises a temperature sensor.

22. The system of claim 20 and further comprising a plurality of gaskets, the plurality of gaskets forming seals between the power outlets and the housing.

23. The system of claim 20 wherein the housing is configured for vertical mounting in the equipment rack.

24. The system of claim 20 wherein the air flow device is coupled to one or more of the at least one air inlet.

25. The system of claim 20 wherein the at least one fan draws air from outside the equipment rack and urges the air into the housing.

26. The system of claim 20 wherein the at least one fan draws air from outside the housing and urges the air through the housing to one or more of the at least one air outlet.

27. An equipment-rack power distribution system comprising:
   a power distribution unit housing;
   a power input penetrating the housing;
   a plurality of power outlets disposed on a surface of the housing;
   circuitry enclosed in the housing interconnecting the power input and the power outlets;
   at least one air inlet associated with the housing;
   at least one air outlet associated with the housing; and
   an air flow device coupled in fluid communication with one or more of the at least one air inlet and the at least one air outlet,
   wherein the air flow device comprises at least one fan and a conduit defining an air passage between the at least one fan and the housing, the at least one fan being coupled to the conduit and the conduit being coupled to the at least one air outlet, the at least one fan drawing air through the at least one air outlet and through the conduit from the power distribution unit housing.

28. The system of claim 27 and further comprising a plurality of gaskets, the plurality of gaskets forming seals between the power outlets and the housing.

29. The system of claim 27 wherein the housing is configured for vertical mounting in the equipment rack.

* * * * *

UNITED STATES PATENT AND TRADEMARK OFFICE
CERTIFICATE OF CORRECTION

| | | |
|---|---|---|
| PATENT NO. | : 9,219,353 B2 | Page 1 of 1 |
| APPLICATION NO. | : 13/293078 | |
| DATED | : December 22, 2015 | |
| INVENTOR(S) | : Ewing et al. | |

It is certified that error appears in the above-identified patent and that said Letters Patent is hereby corrected as shown below:

In the Claims:
In column 6, line 47, in claim 8, after "air" delete "circulation".

Signed and Sealed this
Twenty-third Day of August, 2016

Michelle K. Lee
*Director of the United States Patent and Trademark Office*